Aug. 31, 1948. M. SHOELD 2,448,126
GRANULATED SUPERPHOSPHATE MANUFACTURE
Filed May 17, 1944
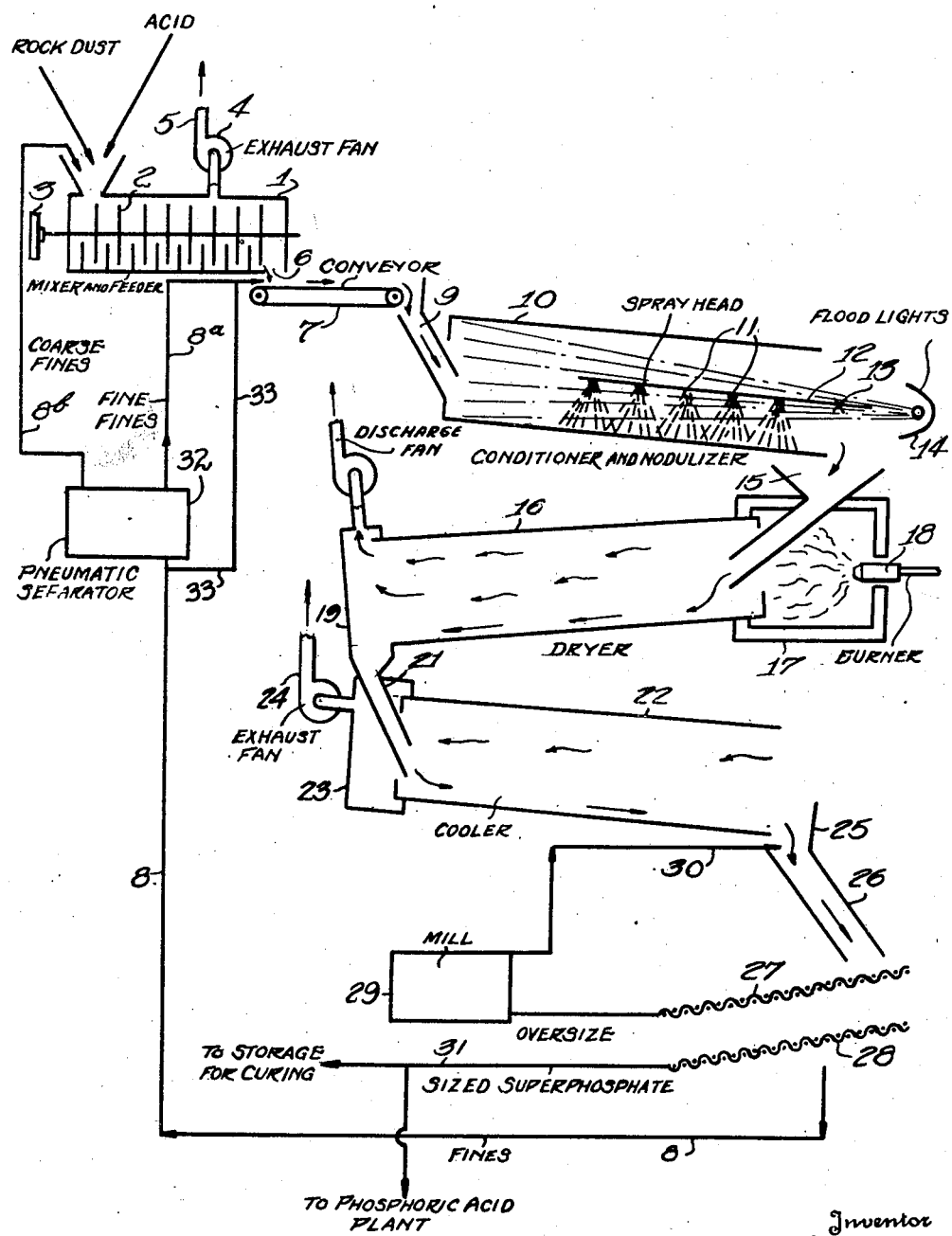
Inventor
MARK SHOELD
By Semmes, Keegin, Bealer & Semmes
Attorneys Patented Aug. 31, 1948

2,448,126

UNITED STATES PATENT OFFICE 2,448,126

GRANULATED SUPERPHOSPHATE MANUFACTURE

Mark Shoeld, Baltimore, Md., assignor to The Davison Chemical Corporation, Baltimore, Md.

Application May 17, 1944, Serial No. 536,006

2 Claims. (Cl. 71—40)

This application is a continuation-in-part of my copending applications Serial Nos. 508,163 and 508,164, filed October 29, 1943, now abandoned.

This invention relates in general to the manufacture of granulated superphosphate and more particularly has reference to the manufacture without a den of granular superphosphate suitable for use in the making of phosphoric acid, and for other purposes.

In the manufacture of superphosphate, the general practice is to mix phosphate rock, ground to proper size, with a predetermined amount of acid, and then transfer the mixture to a den for curing. While in the den reactions between the acid and rock initiated in the mixing stage are allowed to proceed further. Some proposals have been made for the elimination of a den, but these include the provision of an intermediate stage of treatment in place of the den.

An object of this invention is to provide a method of manufacturing granular superphosphates by reacting phosphate rock with an acid without resorting to the use of a den.

Another object of this invention is to provide a method of continuously manufacturing granular superphosphate by reacting phosphate rock and an acid without the use of a den and transferring the granular product directly into extraction tanks for treatment to obtain phosphoric acid.

A further object of this invention is to provide a process for manufacturing superphosphates by mixing finely divided phosphate rock with an acid, introducing the freshly mixed phosphate rock and acid together with superphosphate fines and moisture directly into a conditioning and nodulizing zone and drying the nodulized material.

Still another object of this invention is to provide a method of treating phosphate rock to produce phosphoric acid by mixing phosphate rock with an acid to form a thick slurry, introducing the freshly prepared slurry together with superphosphate fines and moisture directly into a conditioning and nodulizing zone to form nodules of the mixture, drying and cooling the nodulized material and subjecting the cooled nodulized material without further treatment to the action of an acid for obtaining phosphoric acid therefrom.

It is also an object of this invention to treat the fines separated from the sized superphosphate to obtain a further separation into fine fines and coarse fines, to add the coarse fines to the mixer with the acid and rock dust, and to add the fine fines to the conditioner.

With these and other objects in view, the present invention resides in the steps and procedures hereinafter set forth.

In order to facilitate an understanding of the present invention, reference is made to the accompanying drawing in which the single figure is a diagrammatic representation of a system for treating the raw materials to produce the desired product.

In accordance with the present invention, an acid such as sulphuric acid, phosphoric acid or various mixtures of sulphuric acid and phosphoric acid is introduced together with ground phosphate rock into a horizontal mixer 1. The phosphate rock is ground to the required fineness and the acid is of a predetermined concentration and both the acid and phosphate rock are so proportioned as to obtain in the mixer a slurry of desired consistency. The rotary element 2 of the mixer is provided with a drive wheel 3 which is connected with a suitable source of power (not shown).

As indicated in the drawings, the mixer 1 is provided with an exhaust fan 4 for withdrawing gases resulting from the reaction between the acid and the phosphate rock in the mixer. The vapors or gases produced during the mixing of the acid and phosphate rock consist of steam and fluorine containing gases. Any gases withdrawn from the mixer by the exhaust fan 4 are discharged through a conduit 5 to a stack or scrubbing equipment (not shown).

By reason of the mixing of the acid and phosphate rock in the mixer 1, a thick slurry is produced which is discharged through the outlet 6 of the mixer onto a conveyor belt 7. The slurry is thick and is a substantially unset mixture of rock and acid; however, if it were transferred to a regular den it would set up. This is therefore quite distinct from a thin, sloppy slurry.

Prior to deposition of the slurry onto the conveyor belt 7, superphosphate fines are deposited thereon in the form of a thin layer. These phosphate fines are led to the conveyor through a suitable conveyor or chute system indicated on the drawings by reference characters 8 and 8a. In some instances, the fines are sized and the fine fines used. This arrangement provides for the deposition of a layer of fine superphosphate on the conveyor belt before the unset but thickened superphosphate mixture discharged from the mixer 1 drops onto the belt. The deposition of the layer of phosphate fines onto the belt prior to deposition of the thick slurry thereon considerably reduces any tendency of the slurry to adhere to the belt.

The layers of phosphate fines and slurry deposited on the conveyor belt 7 are discharged into a hopper or receiver 9 at the inlet end of a conditioner and nodulizer 10. Positioned within the conditioner and nodulizer are a plurality of sprays 11 which are supplied with water through conduit 12 controlled by valves 13. Actually, in a commercial plant each of the sprays will have an individual valve so that full flexibility of operation is obtained. It will be noted that there are no sprays immediately adjacent the feed end which serves as a mixing zone. A floodlight 14 is provided for fully illuminating the interior of the conditioner and nodulizer so that the operator will at all times have a clear view of the material therein. By properly controlling the supply of moisture to the material in the conditioner and nodulizer through the sprays 11, the material discharged from the lower end of the same will be in the form of small nodules.

Material discharged from the conditioner and nodulizer in the form of small nodules is fed through a hopper and chute 15 into the feed end of a drier 16. The latter is provided with a brick-lined combustion chamber 17 equipped with an oil burner 18. The hot combustion gases are fed concurrently with the granular material through the drier and are collected in the discharge breeching 19. The combustion gases are withdrawn together with moisture from the upper end of the breeching by means of a discharge fan 20 and the dried nodular product is discharged from the lower end of the breeching through a chute or conveyor 21 and fed directly into a rotary cooler 22.

The combined conditioner and nodulizer and the drier are constructed similarly to those shown in my prior Patent No. 2,304,382.

In the diagrammatic lay-out shown in the drawings, the conditioner and nodulizer have been shown located above the drier but obviously it may be located on the same level with the drier and the product discharged therefrom fed by means of a short belt conveyor into the feed end of the drier.

Cooler 22 is provided with a charge breeching 23 into which the dried nodular material is fed by means of the conveyor or chute 21. In addition, the breeching 23 is provided with an exhaust fan 24 for discharging therefrom cooling air drawn into the opposite end of the cooler 22. In this instance, the air is drawn through the material in one direction while the material flows in the opposite direction. The flow of the material through the cooler 22 is effected by rotation of the inclined tubular body.

A collecting hopper 25 is provided adjacent the discharge end of the cooler 22 to receive the cooled granular superphosphate. From the hopper 25 the material is led by a chute or bucket conveyor 26 to classifying screens 27 and 28. These screens may be of any suitable type and serve to classify the material into oversize particles, into undersize particles and particles lying within a definite size range. The oversize particles are sent to a grinding mill 29 in which the particle size is reduced and the ground material is fed through a suitable conveyor system 30 back to the hopper 25. Material passing through screen 28, which is designated as superphosphate fines, may be conveyed through a suitable conveyor system 8 and 33 directly or through storage to the conveyor 7 for introduction into the conditioner 10. Where it is desirable to separate the fines into fine fines and coarse fines, the material passing through screen 28 is conveyed either directly or through storage to the pneumatic separator 32 in which the fines are separated into fine fines and coarse fines. As hereinbefore stated, the fine fines are fed through the conduit or conveyor 8a to the conveyor 7 for introduction into the conditioner 10. The coarse fines are fed from the separator 32 through the conduit or conveyor 8b to the hopper of the mixer 1 for admixture with the acid and rock dust. Both the coarse fines and the fine fines may be fed directly from the separator 32 to the mixer 1 and the conveyor 7 or they may be sent to storage and then used in the mixer 1 and on conveyor 7 as needed.

Intermediate size superphosphate which passes through screen 27 but does not pass through screen 28 is conveyed by a suitable conveyor system 31 either to storage or directly to a plant for the extraction of phosphoric acid therefrom.

If it is desired to produce granulated superphosphate having 20% available $P_2O_5$ for shipment, it is necessary to store the product designated as sized superphosphate for a week or ten days so that the product is fully cured before shipping. On the other hand, if the product is to be used for the manufacture of phosphoric acid, then no curing is required and the necessity for storage of the sized material is unnecessary. In other words, the sized superphosphate may be conveyed directly to a plant for treatment to produce phosphoric acid. It has been found that the sized superphosphate prepared in accordance with the procedure outlined above is particularly suitable for use as a raw material in the manufacture of phosphoric acid in accordance with the process set forth in application Serial No. 374,591, now Patent No. 2,384,773, issued September 11, 1945. When the sized superphosphate is conveyed directly to the phosphoric acid plant the material can be fed directly into the extraction tanks without any storage whatever. If, for purposes of flexibility and to provide for the simultaneous operation of the superphosphate plant in conjunction with the phosphoric acid plant, a certain take-up in the system is required, then additional extraction tanks may be provided in the phosphoric acid system which may or may not be used depending upon the relative outputs of the superphosphate plant and the phosphoric acid plant.

In this instance, there will be no need whatever for handling of the superphosphate from the plant producing the same in and out of storage prior to treating the product in the phosphoric acid plant.

In carrying out the present invention, it is to be understood that the concept of omitting the use of a den or an intermediate curing step can be employed in the manufacture of superphosphate or in the manufacture of triple superphosphate. Thus, by using sulphuric acid, phosphoric acid or mixtures thereof as the acidulating agent, various superphosphates can be made having all the way from 20% available $P_2O_5$ to 48% available $P_2O_5$.

In describing the present invention, reference has been made to a cooler 22. This serves to increase the hardness of the granules which would otherwise be unsatisfactorily soft for the double screening operation. In addition to this advantage of the cooler when the granules are to be used for the manufacure of phosphoric acid it is undesirable to have the granulated superphosphate too warm when introduced into the extraction tanks.

In the transfer of the thickened slurry from the mixer 1 to the conditioner and nodulizer 10 reference has been made to the conveyor 7 onto which a layer of superphosphate fines are first applied before deposition of the slurry. The rock-acid mixture is of course thickened in this operation to a more or less non-flowable mixture but such a mixture can still be rated as substantially unset superphosphate. The use of the conveyor belt between the mixer and the conditioner is a matter of convenience for the mechanical handling of the material. If an operator can attend the charging station at all times to keep an ordinary chute clean, then the returned superphosphate fines might be charged directly with the material from the mixer into the conditioner by means of a steeply inclined chute. The conveyor belt of course eliminates the need for a special operator at the charging station.

The return of the fines to the mixer for admixture with the acid and phosphate rock mixture provides for the control of the reaction between the acid and rock and for the control of the viscosity and semi-dryness of the reaction mass discharged from the mixer. All fines, both coarse and fine, may be returned to the mixer 1 but when a portion is introduced into the mixer 1 and another portion is introduced onto the conveyor belt 7, it is desirable to separate the fines as hereinbefore described, send the coarse fines to the mixer wherein they are broken up and incorporated with the mixture of acid and rock, and send the fine fines to the conveyor belt 7. The fine fines are more easily and effectively incorporated with the thick slurry introduced into the conditioner than are the coarse fines. A more uniform product is thereby obtained.

The present invention also contemplates the manufacture of granular or nodular superphosphate by reacting the phosphate rock with a quantity of acid less than required for the manufacture of cured superphosphate having 20% available $P_2O_5$ as described in my copending application Serial No. 508,164, filed October 29, 1943, in conjunction with the return of classified fines to the mixer and conditioner. For instance, the amount of acid employed may be 80–90% of the usual amount employed for making cured superphosphate having 20% available $P_2O_5$. As pointed out in the above-mentioned application the range of 80–90% is most satisfactory but may be departed from with still favorable results.

From the foregoing description, it will be appreciated that the present invention provides a process for making superphosphates from phosphate rock and a suitable acid without the use of a den or an intermediate curing device in a continuous manner. In addition, the present invention provides for a continuous process of manufacturing superphosphate without the use of a den or other intermediate curing device and the transfer of the freshly prepared material without further treatment directly into a phosphoric acid plant for extraction of the phosphoric acid therefrom.

I claim:

1. A method of manufacturing superphosphate comprising mixing finely divided phosphate rock with an acid selected from the group consisting of sulphuric acid, phosphoric acid and a mixture of sulphuric and phosphoric acids and with a coarse fraction of superphosphate fines to form a thick slurry, discharging the slurry onto a conveyor belt coated with fine superphosphate fines, discharging the slurry together with the fine fines into a conditioning and nodulizing zone, nodulizing the mixture of slurry and fine fines, drying the nodulized material in a drying zone and cooling the dry nodulized material.

2. A method of manufacturing superphosphate comprising mixing finely divided phosphate rock with an acid selected from a group consisting of sulphuric acid, phosphoric acid, and mixtures of sulphuric and phosphoric acids to form a thick slurry, depositing superphosphate fines upon a conveyor belt in the form of a thin layer, depositing the slurry onto said layer of superphosphate fines, introducing the slurry and fines as a substantially unset mixture into a conditioning and nodulizing zone, adding moisture to the material in said zone, and drying the nodulized material in a drying zone.

MARK SHOELD.

REFERENCES CITED

The following references are of record in the file of this patent:

UNITED STATES PATENTS

| Number | Name | Date |
| --- | --- | --- |
| 1,461,077 | Webster | July 10, 1923 |
| 1,875,879 | McKee | Sept. 6, 1932 |
| 1,985,810 | Wight | Dec. 25, 1934 |
| 2,136,793 | Gabeler et al. | Nov. 15, 1938 |
| 2,232,145 | Shoeld | Feb. 18, 1941 |
| 2,248,514 | Shoeld | July 8, 1941 |

FOREIGN PATENTS

| Number | Country | Date |
| --- | --- | --- |
| 165,759 | Great Britain | Nov. 21, 1921 |
| 295,848 | Great Britain | Aug. 23, 1928 |
| 544,274 | Great Britain | Apr. 3, 1942 |
| 549,487 | Great Britain | Nov. 24, 1942 |
| 559,482 | Great Britain | Feb. 22, 1944 |

OTHER REFERENCES

Waggaman, Phosphoric Acid, Phosphates, and Phosphatic Fertilizer, Chem. Cat. Co., New York, 1927, page 165.